2 Sheets--Sheet 1.

SAMUEL R. SMITH.

Improvement in Circular Saw-Mills.

No. 4,409. Reissued May 30, 1871.

Witnesses:
T. C. Brecht.
Phil T. Dodge

Inventor:
S. R. Smith
by Dodge & Munn
his attys

AM. PHOTO-LITHOGRAPHIC CO. N.Y. (OSBORNE'S PROCESS.)

2 Sheets--Sheet 2.

SAMUEL R. SMITH.

Improvement in Circular Saw-Mills.

No. 4,409. Reissued May 30, 1871.

Witnesses:
T. C. Brecht.
Phil. T. Dodge

Inventor:
S. R. Smith
by Dodge & Munn
his Attys

AM. PHOTO-LITHOGRAPHIC CO. N.Y. (OSBORNE'S PROCESS.)

UNITED STATES PATENT OFFICE.

SAMUEL R. SMITH, OF CINCINNATI, OHIO.

IMPROVEMENT IN CIRCULAR-SAW MILLS.

Specification forming part of Letters Patent No. 16,454, dated January 20, 1857; extended seven years; reissue No. 4,409, dated May 30, 1871.

*To all persons to whom these presents shall come:*

Be it known that I, SAMUEL R. SMITH, of Cincinnati, in the county of Hamilton and State of Ohio, have invented a new and useful mechanism for feeding a log laterally during the operation of sawing it into boards or lumber; and I do hereby declare that the same is fully described and represented in the following specification and the accompanying drawing, of which—

Figure 1:
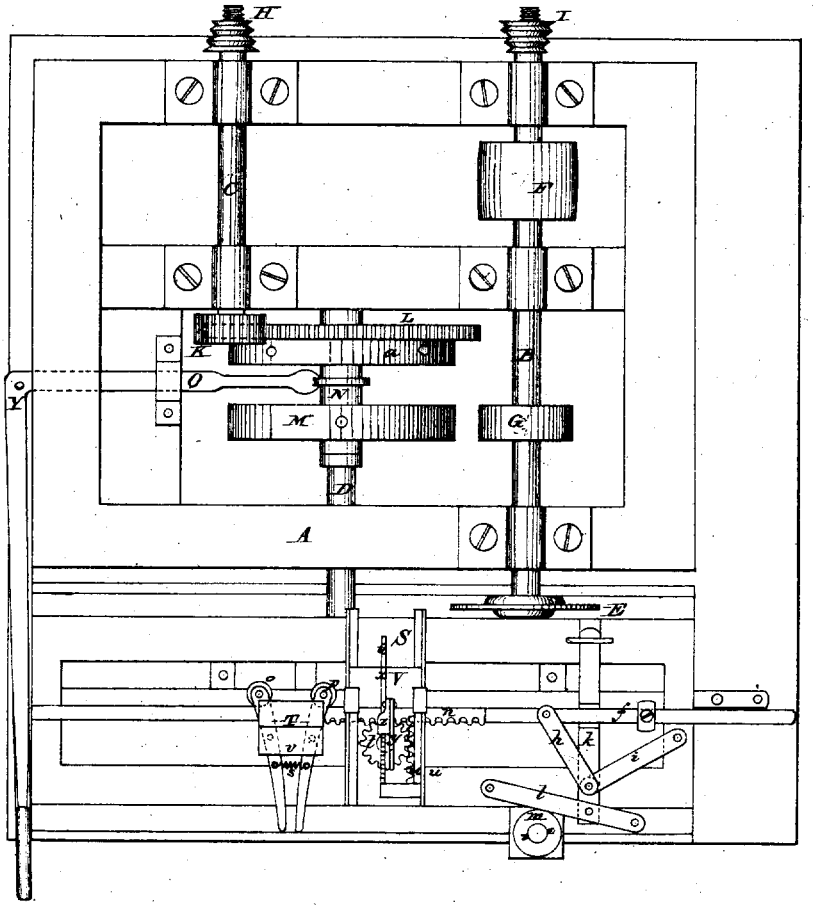
Figure 2:
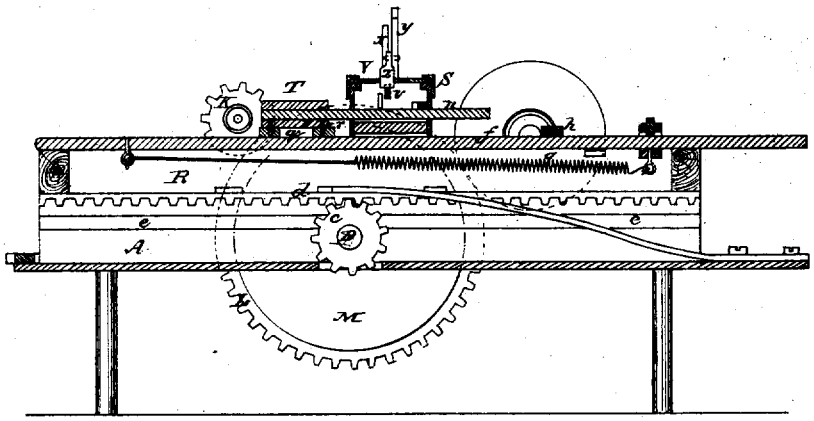
Figure 3:
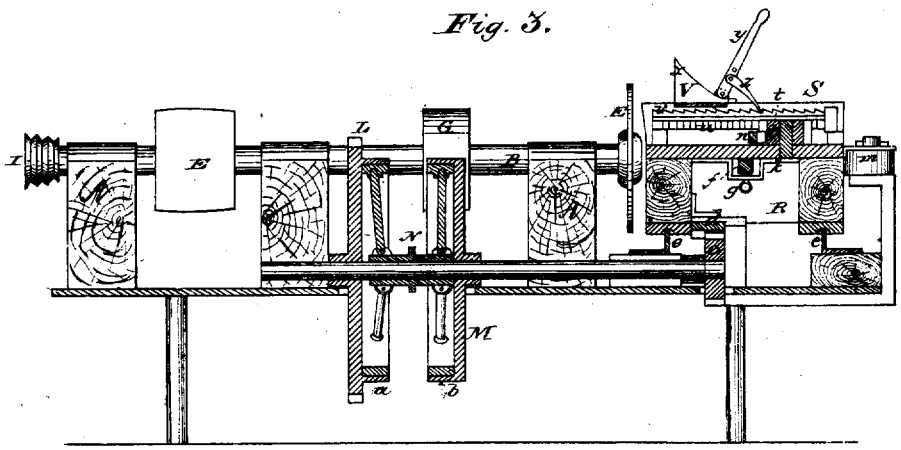

Figure 1 is a top view of my said mechanism as applied to the sawing machinery and carriage of a saw-mill. Fig. 2 is a longitudinal and vertical section of the same taken through the toggle-slide bar, to be hereinafter described. Fig. 3 is a vertical and transverse section taken through the log-presser *x*, and the third shaft D and its clutch mechanism.

In the drawing, A exhibits a frame for sustaining the three shafts B C D, on the inner end of one of which, viz., that marked B, a circular saw, E, is affixed, the said shaft also carrying two pulleys, F and G, disposed on it as shown in Fig. 1. On the two outer ends of the two shafts B C are cone-pulleys H I, around which a band may pass to convey motion from said shaft to the second shaft C. A pinion, K, carried by the said shaft C engages with a gear-wheel, L, which runs loosely on the third shaft D and has a friction-annulus, *a*, extended from its side. Another wheel, M, having a friction-annulus, *b*, is also placed on the shaft D and runs loosely on it, these two wheels being alternately clutched to the shaft by a friction-clutch, N, which is moved by a bent lever, O, which turns upon a fulcrum at P and is arranged as shown in the drawing. An endless belt should run around the wheel M and pulley G. On its outer end the third shaft D carries a pinion, *c*, which engages with a rack, *d*, affixed to the under side of a carriage, R, disposed by the side of the frame A and serving to sustain the mechanism by which the log is supported and moved laterally.

This carriage moves longitudinally on parallel ways or rails *e e*, and supports a frame, S, on which the log, at or near one end of it, is laid or made to rest while being sawed. It is to be understood that the other end of the log is to be supported by similar means applied to the carriage R, and it is to be moved laterally by mechanism applied to it, and similar to that which is employed for moving the first-mentioned end of it laterally.

As my invention relates to the mechanism used to effect the lateral movement of one end of the log, and as each end of it is to be moved by similar mechanism, it will be sufficient to describe that which is applied to set in movement one end of it.

Extending along on the upper part of and from end to end of the carriage R, and underneath the frame S, is a slide-bar, *f*, which slides freely in a longitudinal direction, and is drawn one way by a spring, *g*, applied to it and the carriage R, and arranged as shown in Figs. 2 and 3. To this slide-bar *f* one of a pair of toggles, *h i*, is jointed, the other toggle being jointed to the top of the frame R, while at their common joint the two toggles are connected with a transverse slide-bar, *k*, jointed to a lever, *l*, arranged as shown in Fig. 1, the outer edge of such lever being drawn against the periphery of a standard or friction-roller, *m*, fixed in position (except being capable of rotating on its axis) and disposed of as seen in Figs. 1 and 3. Over and parallel with the bar *f* is a rack, *n*, which slides transversely through the frame S, and projects from a locking and detaching or catch apparatus, shown at T. This latter consists of one or two eccentrics, *o p*, and a fixed stud, *q*. (See Fig. 2.) Each of the eccentrics is carried by one of two levers which turn on fulcrums extended from a block, *r*, from which the rack *n* projects. The tails of these levers are connected by a spring, *s*. From the block *r* the stud *q* extends downward, as seen in Fig. 2, the slide-bar *f* resting against the side of such stud. A pinion, *t*, within the frame S engages with the rack *n*, and also with another rack, *u*, which slides longitudinally in the frame S and carries another rack, *v*, extending along directly underneath a sliding carriage, V, which is supported and moves on the frame S. A presser or knee, X, projects upward from the carriage V, the log, when placed on the frame S, resting against the vertical inner edge of such knee. A lever, *y*, carrying a pawl, *z*, is jointed to the rear end of the carriage V, the said pawl acting in the rack *v* so as to engage the carriage and rack in such manner that the forward movement of the former may be produced by that of the latter.

During the forward movement of the carriage

R the saw will be caused to pass through the log, when the movement of the carriage R is reversed and retracted far enough to permit the log to be moved laterally to the extent desired. During the backward movement of the carriage R the lever *l* will be forced against the roller *m* at the proper time. This will move the toggles so as to cause them to move the slide-bar *f* longitudinally through the slots in the frame R, in which this bar rests, and carries with it the rack *n*, which is securely clutched to the bar *f* by the clutch device hereinbefore described. This rack *n*, in its backward movement, will of course turn the pinion *t*, which in its turn will move the rack *u*, whereby a forward movement of the carriage V will take place, and the log will be moved laterally to the extent required. During the next forward movement of the carriage R, as the lever *l* is released from the friction-roller *m*, the spring *g* will draw the slide-bar *f* forward again.

The carriage R may have suitable studs, projections, or devices, by which, just before it may have completed its movement in either direction longitudinally, it will so act on the lever O of the clutch N as not only to arrest the operation of the mechanism by which it may have been moved, but to set in operation that mechanism used to move it in the opposite direction.

In consequence of the manner in which the carriage V is connected with the rack *v* by which it is moved, the lateral adjustment of the log may be effected at any time by an attendant, who, simply by laying hold of the pawl-lever *y* and pulling upon it so as to force the pawl down upon its rack, may move the presser *x* and with it the log.

A mechanism for so adjusting the log is found to operate to good advantage.

I claim as my invention—

1. The knee V, arranged to slide independently on the head-block and connected to the automatically-operating mechanism by the lever *y* and pawl *z*, substantially as described, whereby it can be operated automatically, and also by hand independently of the automatic apparatus, as herein described.

2. The combination, in a saw-mill carriage, of a head and tail-block having an automatic apparatus mounted thereon, and connected by the longitudinally-moving bar *f* with a hand apparatus, substantially such as described, whereby the log can be adjusted automatically equally at both ends, and also independently at either end, substantially as described.

SAML. R. SMITH.

Witnesses:
S. S. MORRIS,
M. W. OLIVER.